United States Patent [19]

Hildreth et al.

[11] 4,266,939
[45] May 12, 1981

[54] COMPOSITION OF 4-AMINO-4'-NITROSTILBENE-2,2'-DISULPHONIC ACID DIAZO COMPOUNDS AND COLORING PROCESS

[75] Inventors: John D. Hildreth, Macclesfield; Anton F. Tschopp, Oldham; David G. Evans, Rochdale, all of England

[73] Assignee: Ciba-Geigy Corporation, Ardsley, N.Y.

[21] Appl. No.: 45,522

[22] Filed: Jun. 4, 1979

[30] Foreign Application Priority Data

Jun. 7, 1978 [GB] United Kingdom ............... 26466/78

[51] Int. Cl.$^3$ .................... C09B 27/00; D06P 1/00
[52] U.S. Cl. ........................... 8/437; 8/641; 260/206
[58] Field of Search ............. 8/26, 437, 466, 641

[56] References Cited

U.S. PATENT DOCUMENTS

| | | | |
|---|---|---|---|
| 3,557,079 | 1/1971 | Doody | 8/26 |
| 3,802,836 | 4/1974 | Speck | 8/26 |
| 4,098,570 | 7/1978 | Skelly et al. | 8/41 B |

FOREIGN PATENT DOCUMENTS 700210 7/1951 United Kingdom ................ 8/26

OTHER PUBLICATIONS

Venkataraman, K., "The Chemistry of Synthetic Dyes," vol. 1, pp. 634–635 (1952).

*Primary Examiner*—John F. Niebling
*Attorney, Agent, or Firm*—Edward McC. Roberts; John P. Spitals

[57] ABSTRACT

The invention provides dyestuffs of the general formula

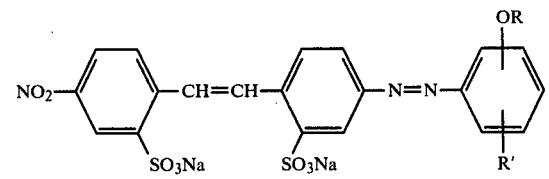

in which R is hydrogen or an alkyl group having 1 to 6 carbon atoms and R' is an alkyl group having 1 to 6 carbon atoms.

6 Claims, No Drawings

COMPOSITION OF 4-AMINO-4'-NITROSTILBENE-2,2'-DISULPHONIC ACID DIAZO COMPOUNDS AND COLORING PROCESS

The present invention relates to novel dyestuffs and to colouring processes, particularly to dyeing or printing natural or synthetic polyamide, wool or leather.

The British patent application No. 14487/76 describes and claims the dye of the formula (I)

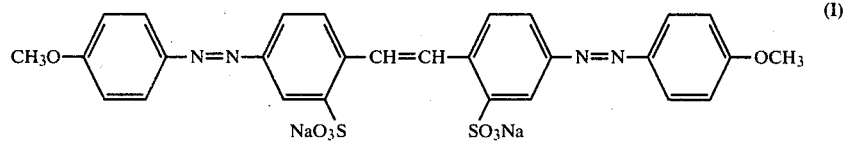

and its use in colouring natural or synthetic polyamide, paper or cotton fibres.

One disadvantage of this compound is that it has relatively low solubility.

We have now surprisingly found that the new dyestuffs of formula II below have good solubility and do not tend to crystallise. The new dyes also have good light stability and good stability to alkalis.

Accordingly, the present invention provides a dyestuff of formula II

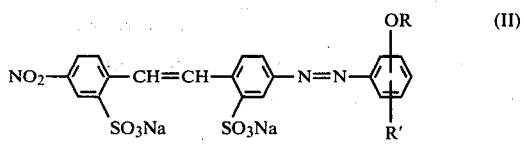

in which R is hydrogen or an alkyl group having 1 to 6 carbon atoms and R' is an alkyl group having 1 to 6 carbon atoms, the OR group being in the para position relative to the R' group.

Preferably the group OR is in the ortho position relative to the azo group.

As alkyl groups, R and/or R' may represent methyl, ethyl, propyl, butyl, pentyl or hexyl, but preferably are methyl or ethyl. More preferably they are both methyl.

The compounds of formula II are readily prepared by diazotising 4-amino-4'-nitrostilbene-2,2'-disulphonic acid and coupling the diazo compound with the desired phenol. Suitable phenols include o-, m- and p-cresol. This gives compounds wherein R is hydrogen. The phenol groups can then be alkylated in known manner, e.g. by reacting with the appropriate dialkyl sulphate, e.g. dimethyl sulphate or diethyl sulphate.

The compounds can be used alone, or in admixture with other similar compounds or in admixture with the compound of formula I above or similar compounds.

For example, a compound of the formula Ia

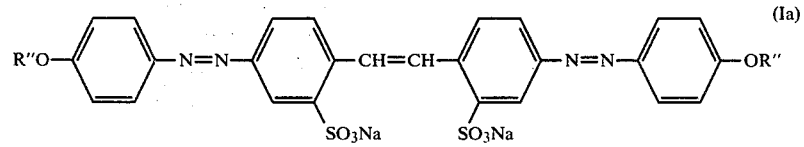

in which R" is an alkyl group having 1 to 6 carbon atoms, may be used in admixture with a compound of the formula IIa

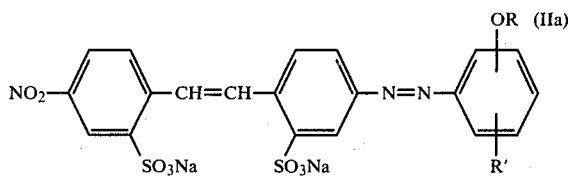

in which R is hydrogen or an alkyl group having 1 to 6 carbon atoms and R' is an alkyl group having 1 to 6 carbon atoms.

In these compositions preferably the compound of formula I is used in admixture with the compound

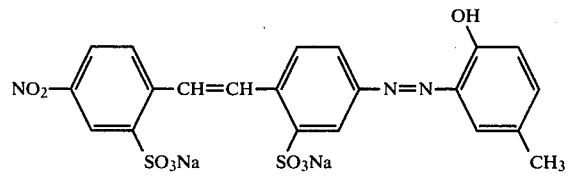

Suitable ratios are from 20:80 to 80:20, preferably from 30:70 to 70:30.

The present invention also provides a process for the colouration of natural or synthetic polyamide, wool or leather, which comprises contacting the fibres thereof with a dyestuff of the formula II above or with a composition containing this dyestuff in admixture with another dyestuff as mentioned above.

Natural polyamide fibres which may be dyed by this process include, for example, wool, and synthetic polyamide fibres include those from ε-caprolactam (Polyamid 6), from adipic acid and hexamethylene diamine (Polyamid 6,6, Nylon), from sebacic acid and hexamethylene diamine (Polyamid 6,10) and from ω-aminoundecanoic acid (Polyamid 11).

The colouration may be carried out by a printing or continuous dyeing process or by exhaustion dyeing.

The colouration may be carried out in the presence of a dyeing assistant, that is, an organic compound which is a solvent for the dye, is liquid under the conditions of the dyeing and is insoluble or only slightly soluble in water, and in which the solubility of the dye in the organic compound is greater than the solubility of the dye in water. Examples of dyeing assistants are benzyl alcohol and compounds of the general formula:

$$R-(OCH_2CH_2)_n-OH \quad (IV)$$

wherein R is a phenyl or chloro-substituted phenyl grouping and n is an integer from 1 to 3.

The amount of the dyeing assistant used may be from 1% to 5%, preferably from 2% to 4% by volume based on the total volume of aqueous solution.

The amount of dye that is used may vary depending on the circumstances, for example, the depth of shade required, and may be within the range of from 0.1% to 1% by weight based on the weight of dye liquor or printing paste.

The liquor ratio is usually from 5:1 to 40:1.

Where a printing or continuous dyeing process is used the colouration may conveniently be carried out by applying the colour at a temperature below the fixation temperature of the dyestuff followed by steaming and afterwards washing and drying.

The temperature at which the colour is applied may for instance be up to 60° C., but preferably ambient temperatures are used. The fibre is first impregnated with a solution of the dyestuff and then excess impregnating liquor is squeezed out for instance by means of rollers. The impregnating solution may also, if desired, contain inorganic or organic acids or the water-soluble salts thereof which are conventionally used in dyeing processes to adjust the pH to between 5 to 7 for example phosphoric acid, sodium phosphate, ammonium acetate, ammonium sulphate, alkyl or aryl sulphonic acid, formic acid, lactic acid, chloroacetic acid and particularly acetic acid for wool and polyamides. They are preferably used in amounts from 1% to 5% by weight based on the total weight of impregnating liquor.

There may also be used in the impregnating liquor a thickening agent. The thickening agent may be any conventional thickening agent used in textile printing but which is compatible with the dye, for instance, a guar gum or locust bean gum ether. Other conventional ingredients may also be present, for instance dye solvents such as urea and oxidising agents such as sodium chlorate.

Where the colouration is carried out by a printing process, a printing paste is applied by a conventional method for instance by means of screens or by a Vigoureux or other printing machine.

The steaming may be carried out at a temperature up to 150° C. and preferably from 100° C. to 110° C. for instance by using saturated or superheated steam at atmospheric pressure. If desired a pressure of up to 0.5 atmospheres higher than atmospheric pressure may be used.

The steaming may be carried out for a varying period of time, for instance up to 2 hours. Longer periods of time may be used but they may be uneconomical, and conveniently the steaming is carried out for a period of from 3 to 20 minutes.

Where the colouration is carried out by means of an exhaustive dyeing method, the fibre may be immersed in the aqueous medium containing the dyestuff, optionally in the presence of a dyeing assistant, at a temperature from 40° to 60° C. The temperature is then raised and the dyeing continued for instance, from 80° C. to the boiling point. The duration of the dyeing may be varied depending on the requirements and may for instance be a period from 15 minutes to 2 hours.

In addition there may optionally be added to the aqueous medium, anionic or nonionic surface active agent or other textile auxiliaries such as sequestering agents or antifoams.

The fibre is afterwards washed and dried by conventional methods.

The following Examples further illustrate the present invention.

EXAMPLE 1

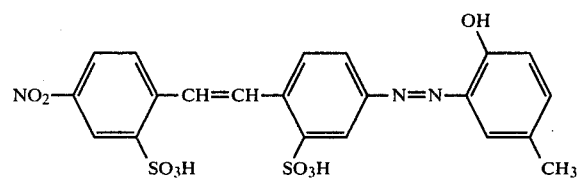

50 g of 5 N sodium nitrite solution is added to a solution of 80 g 4-amino-4'-nitrostilbene-2,2'-di-sulfonic acid and 9 g sodium hydroxide in 650 mls water at 60° C. This is added to a solution of 82 g of 28% hydrochloric acid in 400 ml water at 20° C. The resulting suspension is added slowly to a solution of 24 g p-cresol, 6 g sodium hydroxide and 14 g sodium carbonate in 100 ml water at 10° C., maintaining the pH at 8.5–9.5 by further addition of sodium hydroxide solution. The suspension is heated to 70° C. and sodium chloride is added and the pH adjusted to 7 to precipitate the dyestuff. The yield after drying is 120 g, containing approximately 100 g dyestuff ans 20 g sodium chloride.

EXAMPLE 2

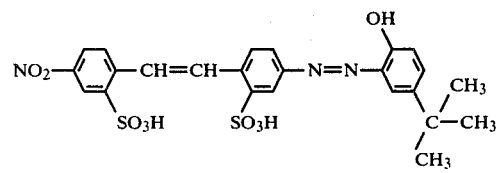

The same procedure as in Example 1 is carried out, except that p-tert.butylphenol is used in place of p-cresol.

EXAMPLE 3

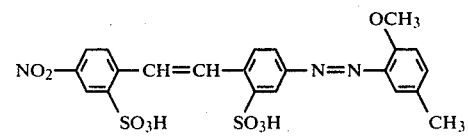

50 g of the product from Example 1 are dissolved in 400 ml water and 4 g sodium hydroxide at 50° C. To this solution 37 g of dimethylsulfate are added over 1 hour and the pH maintained at 11–11.5 by further addition of sodium hydroxide. Then the suspension is heated to 70° C. and kept at 70° C. for 2 hours. Sodium chloride is added and the pH adjusted to 7 to precipitate the dyestuff. The yield after drying is 59 g.

EXAMPLE 4

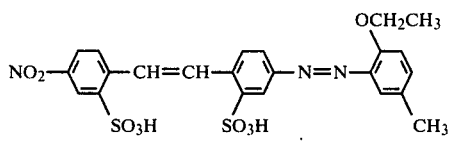

The same procedure as Example 3 is carried out, except that diethylsulfate is used in place of dimethylsulfate.

EXAMPLE 5

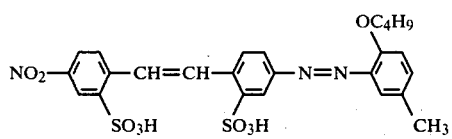

The product from Example 1 is etherified in the usual manner with butyl bromide.

EXAMPLE 6

A printing paste is prepared from:
4 grams of the dyestuff

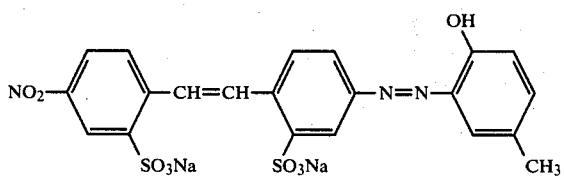

2 grams of an auxiliary containing alkylphenolethoxylate, coconut oil acid amide and solvent,
550 grams of 4% thickener solution based on guar gum,
10 grams acetic acid 80%,
434 grams water.

The above paste was applied by screen printing at 15° C. to a nylon carpet.

The printed carpet was then steamed for 10 minutes in saturated steam at atmospheric pressure and then washed thoroughly in cold water and dried.

A well-defined print in a yellow shade was obtained which was not affected in shade by alkali spotting.

EXAMPLE 7

100 grams of 4 ounce Nylon 66 woven fabric were immersed in an aqueous medium containing:
4 grams of the dyestuff

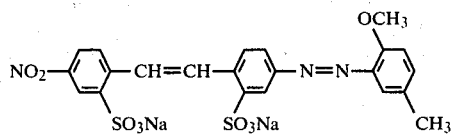

20 grams benzyl alcohol,
10 grams acetic acid,
1000 grams water.

The material was immersed in the aqueous medium at 40° C., the temperature was raised to the boiling point and the dyeing was continued for 1 hour. The finished product was washed with water and was found to have good levelness of dyeing.

EXAMPLE 8

A dyeing liquor is prepared from:
0.5 grams of the dyestuff

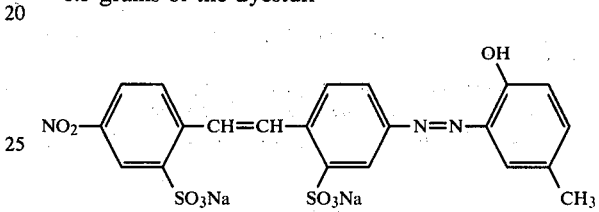

0.5 grams of the dyestuff

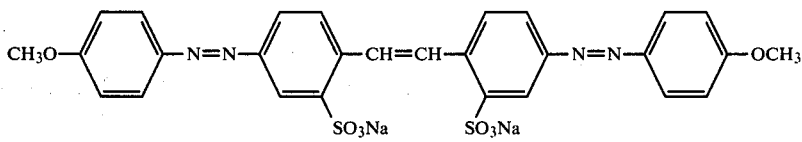

20 grams benzyl alcohol, 10 grams acetic acid, 1000 grams water.

The material was immersed in the aqueous medium at 40° C., the temperature was raised to the boiling point and the dyeing was continued for 1 hour. The finished product was washed with water and was found to have good levelness of dyeing.

The light fastness of this dyeing is better than that one of a dyeing with the same depth of colour which was obtained by using only the first one of the above dyestuffs.

EXAMPLE 9

100 grams of nylon tufted carpet was immersed in an aqueous dye bath containing per liter:
2 grams of the dyestuff

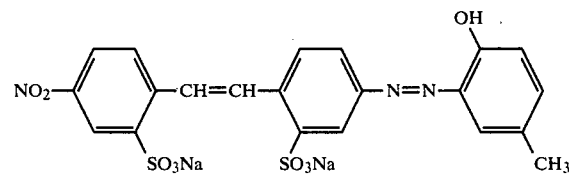

2 grams of the thickening agent based on locust bean grum ether,
2 grams of sodium hydrogen phosphate,
2 grams of the auxiliary used in Example 6.

After being immersed, the carpet material is taken out and held vertically to allow excess dye bath liquor to drip off, so that the known slop-padding procedure in the continuous carpet dyeing process is imitated. The liquor absorption is 450%. The impregnated sample of carpet is subsequently steamed in a loop steamer for 8 minutes at 101° C. in saturated steam. There is thus obtained a sample of carpet dyed in a level yellow shade.

EXAMPLE 10

If the procedure is carried out exactly as described in Example 9, except that instead of the dye bath used therein there is used a bath containing per liter:

2 grams of the dyestuff

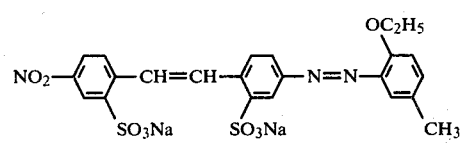

2 grams of the thickening agent based on locust bean gum ether, 2 grams of sodium dihydrogen phosphate, 2 grams of the auxiliary used in Example 6, the result is a sample of carpet dyed in a level yellow shade.

What we claim is:

1. A composition comprising a dyestuff of the formula IIa (IIa)

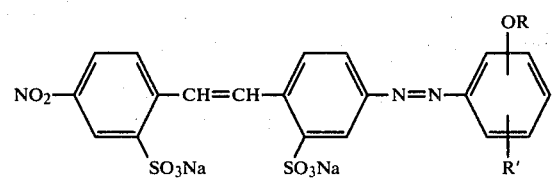

in which R is hydrogen or an alkyl group having 1 to 6 carbon atoms and R' is an alkyl group having 1 to 6 carbon atoms, and a dyestuff of the formula Ia (Ia)

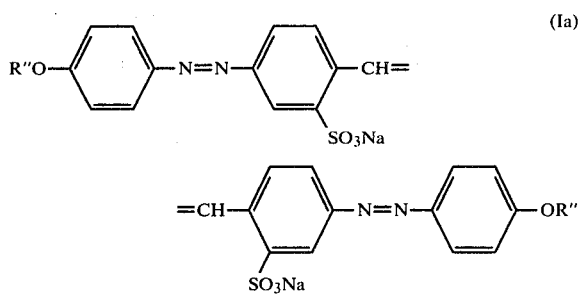

in which R" is an alkyl group having 1 to 6 carbon atoms.

2. A composition as claimed in claim 1 in which the compound of the formula IIa is

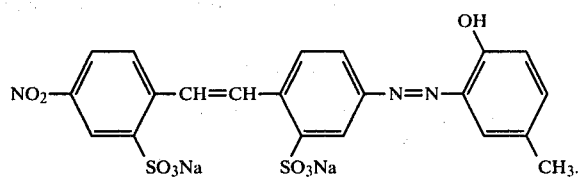

3. A composition as claimed in claim 1 in which the compound of formula Ia is

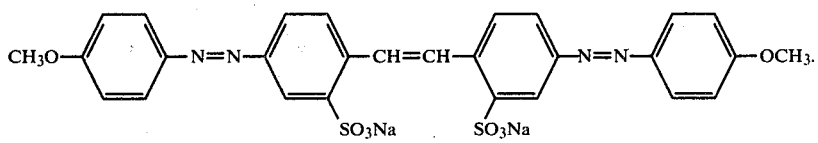

4. A composition as claimed in any one of claims 1 to 3 in which the ratio of compound (I) to compound (II) is from 20:80 to 80:20.

5. A composition as claimed in claim 4 in which the ratio is from 30:70 to 70:30.

6. A process for the colouration of natural or synthetic polyamide, wool or leather which comprises contacting the fibres thereof with a composition as claimed in any one of claims 1 to 5.

* * * * *